Sept. 5, 1950 M. AXELROD 2,520,992
SCREENING PASTE
Filed Aug. 7, 1947
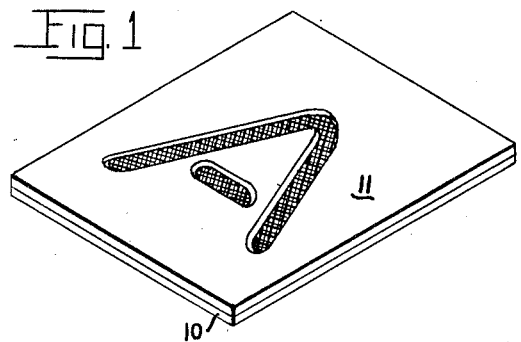
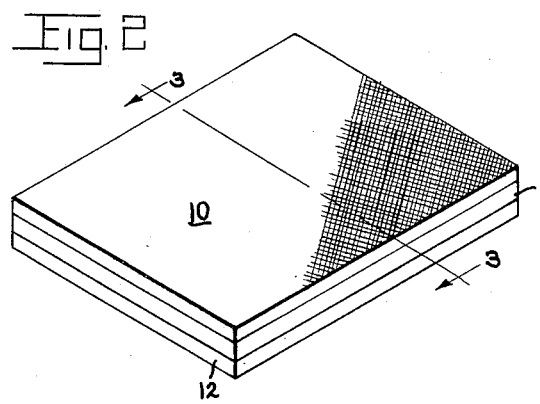
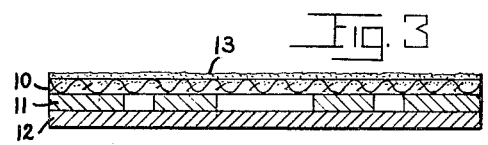
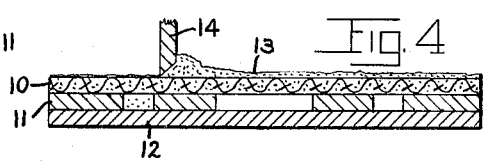
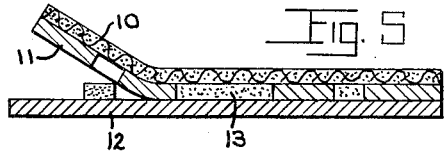
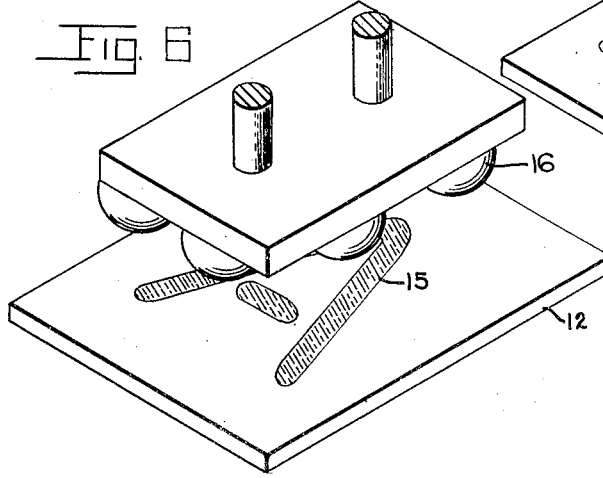
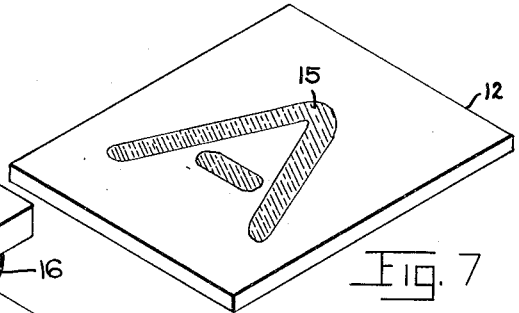
INVENTOR
MAURICE AXELROD
BY
Toulmin & Toulmin
ATTORNEYS Patented Sept. 5, 1950

2,520,992

UNITED STATES PATENT OFFICE 2,520,992

SCREENING PASTE

Maurice Axelrod, Cleveland, Ohio, assignor to Axelagate Corporation, Dayton, Ohio, a corporation of Delaware Application August 7, 1947, Serial No. 767,284

1 Claim. (Cl. 260—33.6)

This invention deals with a process for decorating and printing porcelain, ceramic enamel or similar materials by transfer printing and in particular with a novel and improved screening paste therefor.

The screening pastes used heretofore have the disadvantage that the frit and coloring matter float out of position before fusing to the ceramic surface which is during the firing step. By this invention, a screening paste has been devised by which this drawback is overcome.

It is thus an object of this invention to provide a screening paste which when applied to the surface to be decorated remains in position even during the high temperatures used for firing.

It is also an object of this invention to provide an improved screening paste for transfer printing with which a copy of the print is obtained with perfectly outlined contours.

It is another object of this invention to provide a process for transfer printing which is suitable for the application of handwriting, printed matter, ornamental designs and pictures to porcelain, ceramic enamel and like materials.

It is another object of this invention to provide a process for transfer printing with which designs formed of extremely fine and delicate outlines may be satisfactorily transferred to a carrier of porcelain, ceramic enamel or similar materials.

It is still another object of this invention to provide a process for transfer printing which does not necessitate the use of adhesive materials for the purpose of holding the pattern in place on the carrier when applied as a decal.

These and other objects are accomplished by using, for the transfer of decals in the customary manner, a screening paste—or as it is also often called a squeegee oil or printing ink—which consists of an organic binder, a pigment with or without a frit and sufficient solvent so as to give it the proper screening consistency.

For the binder, thermoplastic resins which sublime or distill at the temperature of firing or which evolve volatile depolymerization products and leave a colorless or no residue are preferred. Resins which answer this requirement are phthalic acid condensation products, polyethylene resins, polystyrene resins, polyisobutylene resins, the polyacrylic esters, and the polyvinyl esters. Alkyl polysulfides and factice, which evolve hydrogen sulfide at firing temperature, are also operative.

Solvents which proved especially suitable for the purpose of this invention are ethylene glycol monoethyl ether acetate, benzyl ether of ethylene glycol monoethyl ether, isophorone, mesityl oxide and hydrogenated naphthas having a boiling point of from 365° to 419° F.

The coloring oxides usable are those which are customarily used in the fields of ceramics. Instead of coloring oxides, other pigments may also be employed.

A screening paste which yields especially satisfactory results consists of from 4 to 10 parts by weight of a coloring oxide with or without a frit, 1 part by weight of the polymer of butylmethacrylate and approximately 1½ parts by weight of a hydrogenated naphtha having the boiling range set forth. By substituting the polymer of ethyl methacrylate for the polymer of butyl methacrylate in the above example, a screening paste will be formed which yields results which are just as satisfactory as when the polymer of butyl methacrylate is used.

In using the screening paste according to my invention, I proceed as is customary in the art for decal manufacture. Thus a stencil medium with the design cut out and attached to a screen is applied to the surface to be decorated or to a temporary carrier with the stencil adjacent to the surface of the carrier. After being applied to the surface to be decorated, my novel screening paste is placed on the screen and forced therethrough and through the cut-outs of the stencil. The surface of the paste and the screen are then removed, and the enamel carrier with the design thereon is finally air-dried or force-dried and fired.

The article to be decorated may be warm when the decal is applied without there being a necessity for the use of an auxiliary adhesive or of an "overvarnish." This represents a vital improvement of the printing process as compared with those using the customary screening paste.

The invention will be more fully understood from the following description taken in connection with the accompanying drawings, in which Figure 1 is a perspective view of a screen with a stencil affixed thereto;

Figure 2 is a perspective view of said assembly of Figure 1 as applied to the article to be decorated;

Figure 3 is a cross-sectional view taken along line 3—3 of Figure 2, but showing the assembly after the application of screening paste;

Figure 4 is a similar cross-sectional view of the same assembly while the screening paste is being forced through the screen and the stencil;

Figure 5 is a cross-sectional view of the same assembly showing removal of the screen with the stencil after the surplus of the screening paste has been taken away from its surface;

Figure 6 is a perspective view of the decorated article and the baking equipment; and Figure 7 is a perspective view of the finished article.

Referring to the drawings in detail, and in particular to Figure 1, the reference numeral 10 indicates a screen to which a stencil 11 has been applied. It will be seen that the letter A, which in this instance is the pattern to be transferred, has been cut out from said stencil. In Figure 2 the screen-stencil assembly of Figure 1 has been applied to the article 12 to be decorated.

Thereafter, a screening paste 13 (Figure 3) is put on the screen and forced therethrough and through the cut-outs of the stencil by means of a scraper 14 (Figure 4). Thereupon any excess of screening paste which might have remained on the outside surface of the screen is removed, and the screen is then peeled off (Figure 5).

The coating applied to the article finally has to be dried. This may be carried out by simply allowing the coating to air-dry; however, drying may be accelerated by baking or force-drying the coating. In the instance of Figure 6, drying is carried out by means of infra-red lamps 16. The finished article (Figure 7) has on its surface a reproduction of the letter A, designated with the reference numeral 15.

The process using the screening paste of this invention is especially suitable for imprinting delicate design or scripts in which extremely fine outlines and sharp contours have to be reproduced. This method, for instance, has been used for imprinting thin and fine handwritten matter on enamel or porcelain; complete and legible reproductions thereof were always obtained. Moreover, the coloring matter and frit do not float out of position before fusing to the ceramic surface while being fired as is the case with the screening pastes used heretofore.

It will be understood that while there have been described herein certain specific embodiments of my invention, it is not intended thereby to have the invention limited to the specific details given in view of the fact that the invention is susceptible to various modifications and changes which come within the spirit of the disclosure and the scope of the appended claim.

I claim:

A screening paste consisting of one part by weight of polymerized ethyl methacrylate, 4 to 10 parts by weight of oxide pigment coloring and 1½ parts by weight of hydrogenated naphtha having a boiling range of from 365° to 419° F.

MAURICE AXELROD.

REFERENCES CITED

The following references are of record in the file of this patent:

UNITED STATES PATENTS

| Number | Name | Date |
|---|---|---|
| 2,279,496 | Sackett | Apr. 14, 1942 |
| 2,379,507 | Deyrup | July 2, 1945 |
| 2,397,744 | Kertesz | Apr. 2, 1946 |